(12) United States Patent
Lipson et al.

(10) Patent No.: US 10,890,728 B2
(45) Date of Patent: Jan. 12, 2021

(54) ON CHIP WAVELENGTH MULTIPLEXING AND DEMULTIPLEXING IN MULTIMODE WAVEGUIDE

(71) Applicant: The Trustees of Columbia University in the City of New York, New York, NY (US)

(72) Inventors: Michal Lipson, New York, NY (US); Mohammad Amin Tadayon, Bronx, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 16/384,613

(22) Filed: Apr. 15, 2019

(65) Prior Publication Data
US 2019/0319733 A1 Oct. 17, 2019

Related U.S. Application Data

(60) Provisional application No. 62/657,109, filed on Apr. 13, 2018.

(51) Int. Cl.
*G02B 6/43* (2006.01)
*H04J 14/02* (2006.01)
(Continued)

(52) U.S. Cl.
CPC .......... *G02B 6/43* (2013.01); *G02B 6/12007* (2013.01); *G02B 6/2938* (2013.01); *H04B 10/11* (2013.01);
(Continued)

(58) Field of Classification Search
CPC .... G02B 6/02309; G02B 6/241; G02B 6/245; G02B 6/25; G02B 6/262; G02B 6/02052; G02B 6/12007; G02B 6/2938; G02B 6/43; G02B 6/29364; G02B 6/29368; G02B 2006/12069; G02B 2006/1209;
(Continued)

(56) References Cited

U.S. PATENT DOCUMENTS 9,389,363 B2   7/2016  Heroux
9,425,917 B1   8/2016  Pezeshki
(Continued)

FOREIGN PATENT DOCUMENTS

WO   2016/148717 A1   9/2016

OTHER PUBLICATIONS

Dai D. et al., Silicon-based on-chip multiplexing technologies and devices for Peta-bit optical interconnects, Nanophotonics vol. 3 / Issue 4-5 pp. 283-311 Aug. 2014.
(Continued)

*Primary Examiner* — Michael P Mooney
(74) *Attorney, Agent, or Firm* — BakerHostetler

(57) ABSTRACT

Example methods, devices, and systems for optical transmission are disclosed. An example method can comprise coupling a plurality of optical filters to a substrate. The method can comprise coupling a polymeric waveguide to the plurality of optical filters. The polymeric waveguide can be configured to guide a free space optical signal along the polymeric waveguide and communicate, via the plurality of optical filters, one or more components of the free optical space signal to an integrated chip.

20 Claims, 9 Drawing Sheets

(51) Int. Cl.
*G02B 6/293* (2006.01)
*G02B 6/12* (2006.01)
*H04B 10/11* (2013.01)

(52) U.S. Cl.
CPC ...... *H04J 14/02* (2013.01); *G02B 2006/1209* (2013.01); *G02B 2006/12069* (2013.01); *G02B 2006/12109* (2013.01); *G02B 2006/12164* (2013.01)

(58) Field of Classification Search
CPC ........... G02B 2006/12109; G02B 2006/12164; A61B 18/00; A61B 18/18; A61N 5/00; H04B 10/40; H04B 10/11; H04J 14/02
USPC ...... 385/27, 28, 31, 38, 39, 123, 14, 15, 24, 385/47
See application file for complete search history.

(56) References Cited

U.S. PATENT DOCUMENTS

| | | |
|---|---|---|
| 9,450,696 B2 | 9/2016 | Shaver et al. |
| 2013/0142475 A1 | 6/2013 | Dallesasse et al. |
| 2013/0343697 A1* | 12/2013 | Ishibashi ............ G02B 6/12004 385/14 |
| 2014/0363165 A1* | 12/2014 | Panotopoulos .......... G02B 6/43 398/79 |

OTHER PUBLICATIONS

Ding Y et al., On-chip two-mode division multiplexing using tapered directional coupler-based mode multiplexer and demultiplexer, Optics Express vol. 21 / Issue 8 pp. 10376-10382 Apr. 2013.
Dong J. et al.,. Mode multiplexer based on integrated horizontal and vertical polymer waveguide couplers. Optics Letters vol. 40 / Issue 13 pp. 3125-3128 Jun. 26, 2015.
Liu A et al, Paniccia M. Wavelength division multiplexing based photonic integrated circuits on silicon-on-insulator platform. IEEE J. Sel. Top. Quantum Electron. Nov. 2009; 16(1): pp. 23-32.
Sabry YM et al., Monolithic silicon-micromachined free-space optical interferometers onchip, Laser & Photonics Reviews, vol. 9 / Issue 1, pp. 1-15, Nov. 2014.
Salamin Y et al, Direct Conversion of Free Space Millimeter Waves to Optical Domain by Plasmonic Modulator Antenna, Nano Letters, vol. 15 / Issue 12, pp. 8342-8346, Nov. 2015.
Ye M et al. On-chip multiplexing conversion between wavelength division multiplexing-polarization division multiplexing and wavelength division multiplexing-mode division multiplexing. Opt. Lett. Feb. 2014; 39(4): pp. 758-761.

* cited by examiner

ON CHIP WAVELENGTH MULTIPLEXING AND DEMULTIPLEXING IN MULTIMODE WAVEGUIDE

CROSS-REFERENCE TO RELATED APPLICATION

This application claims the benefit of U.S. Provisional Patent Application No. 62/657,109, filed Apr. 13, 2018, which application is hereby incorporated by reference in its entirety for any and all purposes.

BACKGROUND

Today most of the micro/nanofabrication techniques for photonics multiplexing and demultiplexing are optimized for thin films. These approaches, however, introduce challenges when there is a need for wavelength analyzing or dividing of light coming from/going outside of an integrated chip. Multiplexing and demultiplexing are the processes that allow multiple signals to be combined or un-combined over one shared medium and is relevant to telecommunications. Multiplexing and demultiplexing in the context of photonics uses various aspects of light like wavelength or polarization as orthogonal signals, and these signals are generally analyzed by on-chip devices. Because analysis of incoming light beams is accomplished on-chip, the majority of fabrication techniques are optimized for thin films, where incoming light is brought to the chip through optical fiber and guided through the chip using a waveguide.

Transitioning free space optics into an on-chip device presents a significant challenge in part because waveguides have difficulty carrying poorly defined beams of light through the various parts of the chip device without significant diffraction. Accordingly, there is a need for improved techniques for transmission of free space optical signals to an integrated chip as well as a need for improved devices.

SUMMARY

In meeting these long-felt needs, example methods, devices, and systems for optical transmission are disclosed. An example method can comprise coupling a plurality of optical filters to a substrate. The method can comprise coupling a polymeric waveguide to the plurality of optical filters. The polymeric waveguide can be configured to guide a free space optical signal along the polymeric waveguide and communicate, via the plurality of optical filters, one or more components of the free optical space signal to an integrated chip.

An example device can comprise a polymeric waveguide configured to guide a free space optical signal along the polymeric waveguide. The device can comprise a plurality of optical filters coupled with the polymeric waveguide and configured to guide one or more components of the free space optical signal to an integrated chip configured to process the one or more components of the free space optical signal.

BRIEF DESCRIPTION OF THE DRAWINGS

The above-mentioned and other features and advantages of this disclosure, and the manner of attaining them, will become apparent and be better understood by reference to the following description of one aspect of the disclosure in conjunction with the accompanying drawings, wherein.

DETAILED DESCRIPTION OF ILLUSTRATIVE EMBODIMENTS

Figure 1:
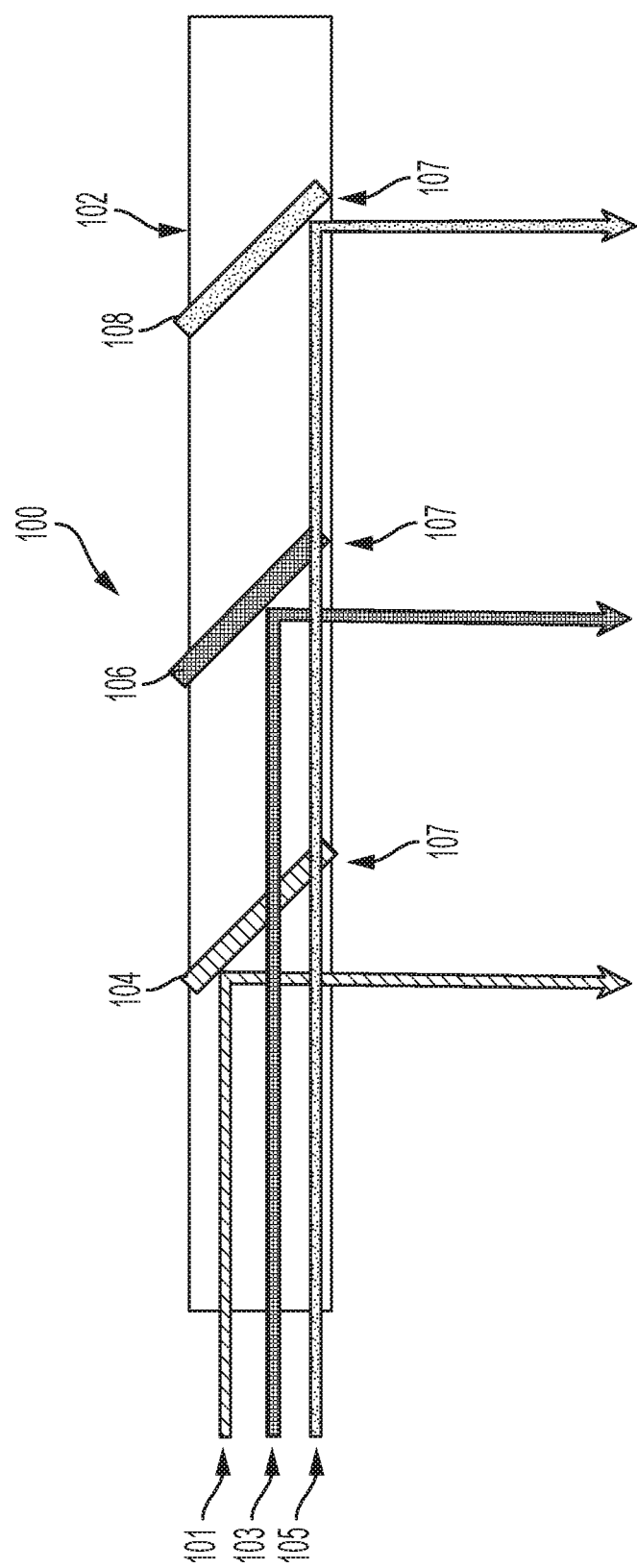
FIG. 1 shows a single waveguide and the multi-line filter for multiple wavelength light delivery.

The present disclosure provides, inter alia, on-chip multiplexing and demultiplexing (e.g., of wavelength or other component) in a comparatively thick multimode waveguide. By using a transition between the free space optics and on chip micro/nanophotonics technologies, the present disclosure introduces a solution for on chip light analysis/division for light coming from/going toward the larger free space optics.

This present device comprises one or more filters combined with (e.g., coupled with, integrated with) a polymeric waveguide. The waveguide can be configured to avoid diffraction. The waveguide can be configured to guide light through different regions of an integrated circuit (e.g., monolithically integrated circuit), such as a chip. The waveguide can comprise a multimode waveguide. The waveguide can be used for controlling interactions and/or light beam shape (e.g., input and/or output light beam shape) in free space optics (e.g., in applications where controlling of the input/output light beam shape is challenging to control).

The present device can be configured for multiplexing. Multiplexing can comprise channeling multiple signals in a single (e.g., or shared) combined medium (e.g., a cable). The reverse process of multiplexing is demultiplexing. Combining the processes of multiplexing and demultiplexing can dramatically increase bandwidth density.

In photonics, light can be transmitted via a shared medium. Multiple signals can take the form of different wavelengths or polarizations of the light. Photonic multiplexing and/or demultiplexing can be accomplished in on-chip devices using filters and gratings. Photonic multiplexing and/or demultiplexing can be accomplished with polymeric waveguides and/or optical fibers guiding the light through the device. As a result, most fabrication techniques that target photonic multiplexing and demultiplexing are optimized for thin films and on-chip set ups, rather than free space optics.

The present disclosure describes, inter alia, methods to transition a signal from a free space optical system to an on-chip device. The device can be configured to perform analysis and/or division of the incoming light into its constituent wavelengths. A novel approach of the disclosed technology can comprise the use of a multimode waveguide (e.g., a thick multimode waveguide). The waveguide can be configured to prevent diffraction of light while the light is guided from free space into fibers and/or through different components on the chip, or from the chip into free space. The size of the waveguide enables analysis of ill-defined input/output light beams (e.g., which is frequently a challenge for analyzing free space light with an on-chip multiplexer).

The disclosed device can be formed using a fabrication process that is modular. The fabrication process can comprise photolithography, electron beam evaporation, sputtering, a combination thereof, and/or the like to mount and secure filters on a substrate. A waveguide mask can be disposed onto a substrate. The waveguide mask can be heated such that a polymer (e.g., SU-8 2025) melts and fills the mold (e.g., waveguide mask). The waveguide can be completed by curing the polymer and removing the mold. The fabrication technique can be compatible with commercially available filters and other polymer processing techniques, thus allowing for variable device architecture.

FIG. 1 shows an example device in accordance with the present disclosure. The device 100 can comprise a waveguide 102. The waveguide 102 can comprise a polymeric waveguide. The waveguide 102 can comprise any polymer. The waveguide 102 can be configured to receive a free space optical signal. The waveguide 102 can be configured to guide the free space optical signal along the waveguide 102 (e.g., along the length of the waveguide 102).

The free space optical signal can comprise one or more components, such as a first component 101, a second component 103, and a third component 105. The first component 101 can have a first wavelength. The second component 103 can have a second wavelength. The second component 105 can comprise a third wavelength. The first component, the second component, and the third component can be different from each other. The first wavelength, second wavelength, and the third wavelength can be different from each other.

The device 100 can comprise a plurality of filters 107 (e.g., or at least one filter), such as a first filter 104, a second filter 106, and/or a third filter 108. The plurality of filters 107 can comprise optical filters. The plurality of filters 107 can be configured to multiplex and/or de-multiplex light (e.g., or other electromagnetic radiation signal) from a plurality of different wavelengths. The plurality of filters 107 can be coupled with the waveguide 102. The plurality of filters 107 can comprise bandpass filters. The plurality of filters 107 can pass frequencies within a certain range and/or reject (e.g., reflect) frequencies in another range. The rejected frequencies can be demultiplexed from a signal of the waveguide 102. The plurality of filters 107 can be configured to guide the one or more components of the free space optical signal to and/or from the waveguide 102. The plurality of filters 107 can be configured to guide the one or more components of the free space optical signal to and/or from an integrated chip (e.g., or other circuit element). The integrated chip can be configured to process the one or more components of the free space optical signal.

The first filter 104 can be configured to guide the first component 101 to and/or from the waveguide 102. The second filter 106 can be configured to guide the second component 103 to and/or from the waveguide 102. The third filter 106 can be configured to guide the third component 105 to and/or from the waveguide 102.

The first filter 104 can be configured to guide the first component 101 to and/or from the integrated chip (e.g., or other circuit element). The second filter 106 can be configured to guide the second component 103 to and/or from the integrated chip (e.g., or other circuit element). The third filter 106 can be configured to guide the third component 105 to and/or from the integrated chip (e.g., or other circuit element).

Figure 2:
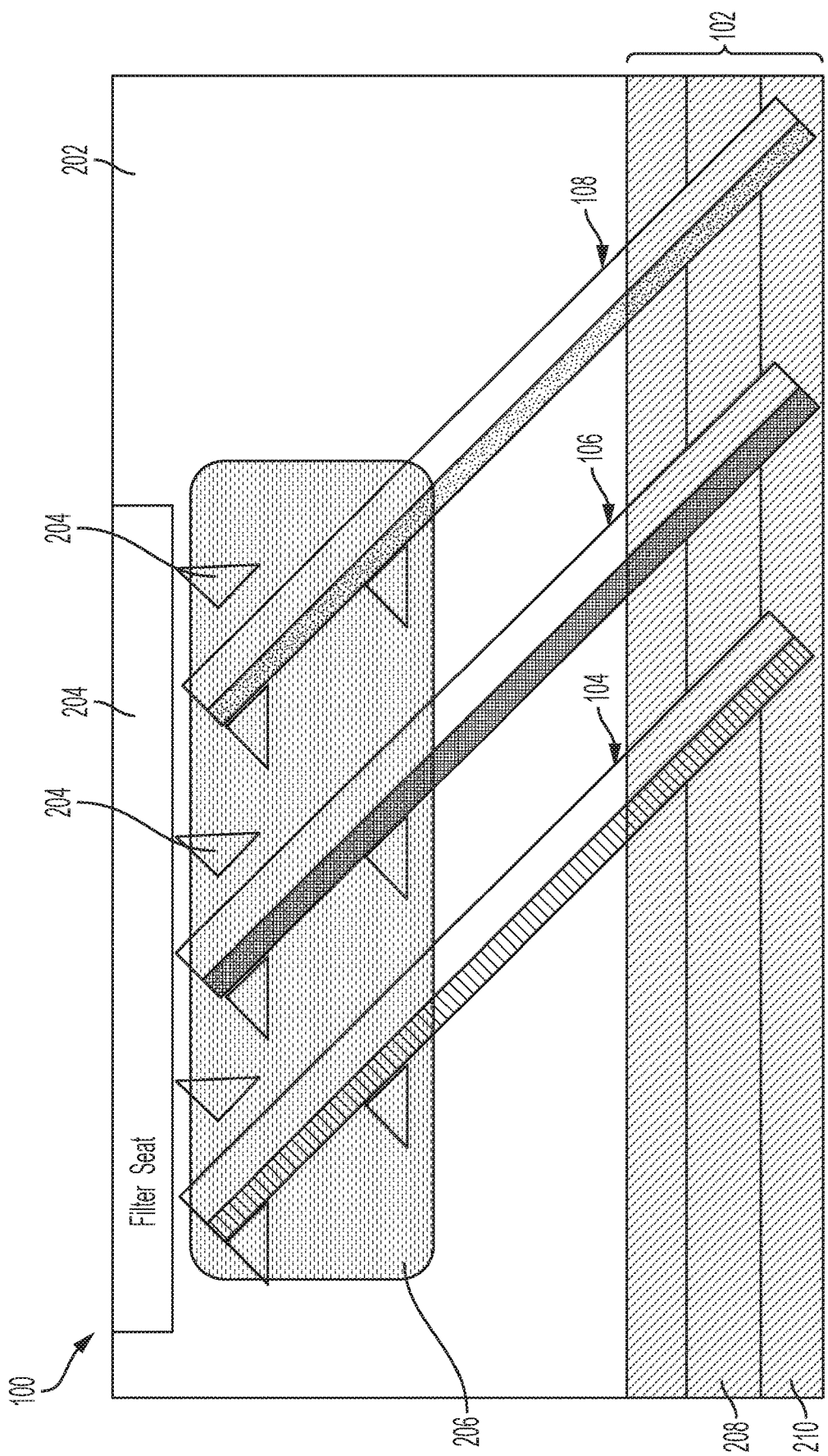
FIG. 2 shows an example device after fabrication.

FIG. 2 shows an example device 100 after fabrication. The device 100 can comprise a substrate 202. A plurality of filter seats 204 can be disposed on the substrate 202. The plurality of filter seats 204 can be configured for securing the plurality of filters 107, such as the first filter 104, the second filter 106, and the third filter 108. The plurality of filters 107 can be coupled to the substrate 202 and/or the plurality of filter seats 204 by an adhesive layer 206. The adhesive layer 206 can be disposed on top of at least a portion of the substrate 202, the plurality of filter seats 204, and/or the plurality of filters 107. The waveguide 102 can comprise a core 208. The core 208 can comprise a polymer and/or other material. The waveguide 102 can also comprise cladding 210. The cladding 210 can be disposed adjacent, on top of, at least partial enclosing the core 208, a combination thereof, and/or the like. The cladding 210 can comprise a polymer and/or other material.

The waveguide 102 can have a thickness that is optimized for free space light (e.g., poorly defined free space light). The thickness of the waveguide 102 can be in a range of about 1 μm to about 1 mm, about 10 μm to about 20 μm, about 10 μm to about 1 mm, about 1 μm to about 100 μm, about 1 μm to about 500 μm, and/or the like. As an example, the thickness can be about 100 μm. The device 100 and/or waveguide 102 can be optimized (e.g., have a thickness, width, or other material properties) for multiplexing and demultiplexing analysis. The device 100 can be fabricated using a negative photoresist. The negative photoresist can be used to make the plurality of filter seats 204 on the substrate 202 (e.g., or chip). The plurality of filters 107 (e.g., first filter 104, second filter 106, third filter 108) can be fabricated using electron beam evaporation or sputtering. The waveguide 102 can be formed by using a waveguide mask (e.g., or waveguide mold). A material (e.g., polymer) for the waveguide 102 can be heated. Heating of the material can decrease the viscosity of the material such that the material fills the waveguide mask by capillary action. The waveguide mask and/or material can be cooled. The material can be cooled at a rate that minimizes and/or avoids cracking. Curing the material can result in the formation of one or more of the waveguide 102 or a lens. The methods and devices disclosed can be compatible with commercially available filters and various device architectures.

Figure 3A:
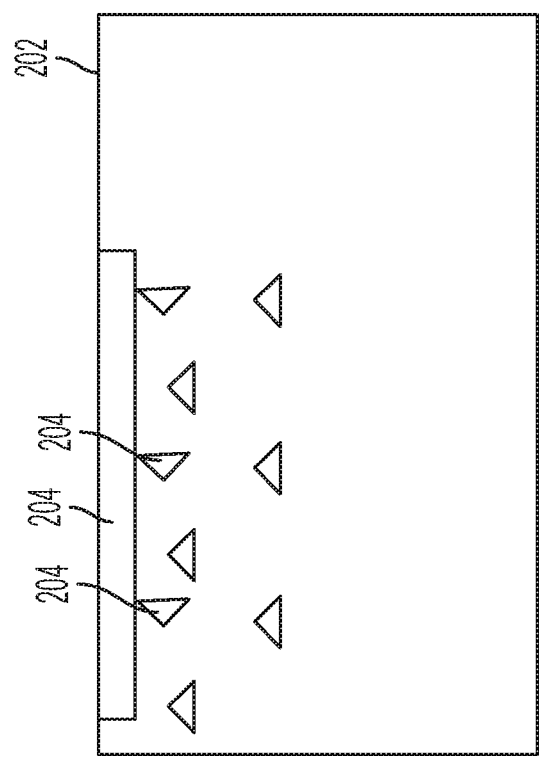
FIG. 3A shows fabrication of a plurality of filter seats for an example device.
Figure 3B:
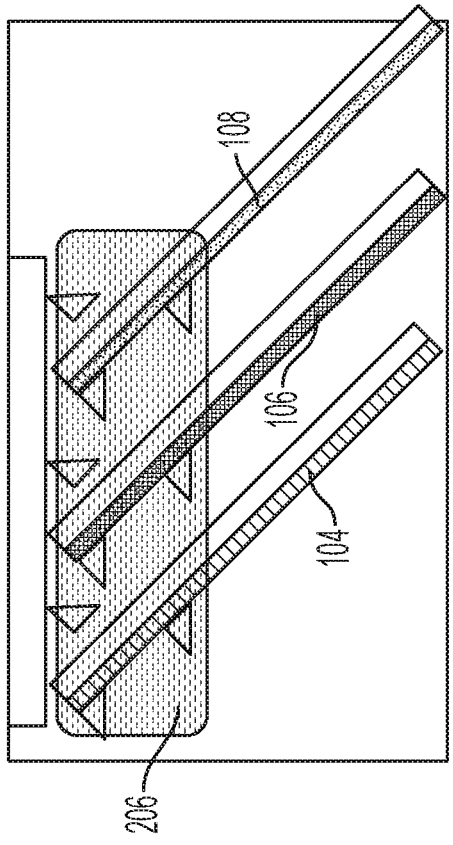
FIG. 3B shows the disposing of a plurality of filters for the example device.
Figure 3C:
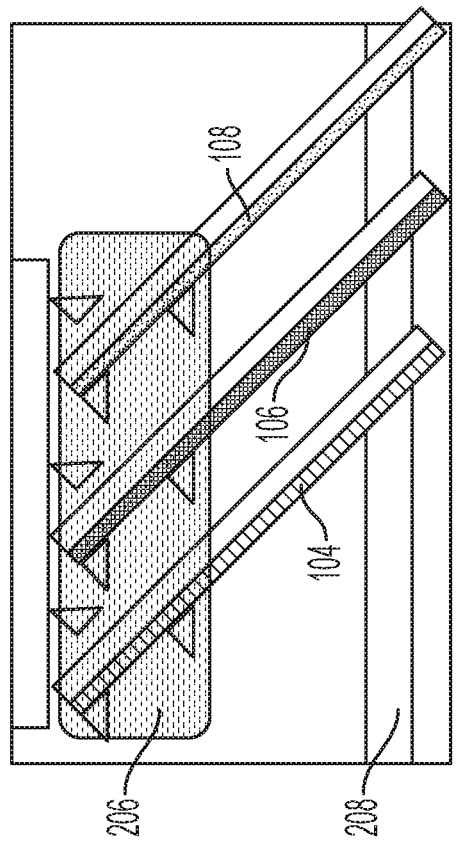
FIG. 3C shows fabrication of a waveguide core for the example device.

An example fabrication process is described in further detail as follows. FIGS. 3A-3C shows fabrication of an example device in accordance with the present disclosure. FIG. 3A shows fabrication of a plurality of filter seats 204 for an example device. A substrate can be obtained by purchase or fabrication. The substrate can be used as both a holder of a plurality of filter seats 204 and the waveguide 102. A plurality of filter seats 204 can be fabricated (e.g., on the substrate) using photolithography. A negative photoresist can be used for fabrication of the plurality of filter seats. The negative photoresist can be disposed on the substrate. The negative photoresist can be selectively exposed (e.g., using a photomask) to radiation. The negative photoresist can be selectively etched to reveal the plurality of filter seats 204.

The plurality of filter seats 204 can be disposed in a pattern. The plurality of filter seats 204 can comprise different filter seats designed for securing different filters. The plurality of filter seats can comprise a first set of filter seats disposed in a pattern for securing the first filter 104. The plurality of filter seats 204 can comprise a second set of filter seats disposed in a pattern for securing the second filter 106. The plurality of filter seats 204 can comprise a third set of filter seats disposed in a pattern for securing the third filter 108. The pattern can allow for securing the plurality of filters 107 at an angle with respect to an edge of the substrate. Spaces between the plurality filter seats 204 can allow for the plurality of filters 107 to be disposed between the plurality of filter seats 204.

FIG. 3B shows the disposing of a plurality of filters 107 for the example device. The plurality of filters can be coupled to (e.g., placed, disposed, attached) the substrate. The plurality of filters 107 can be coupled with an orientation defined by the plurality of filter seats 204. The plurality of filters can be disposed at an angle with respect to the edge of the substrate.

The plurality of filters 107 can be coupled to (e.g., using adhesive) corresponding filter seats of the plurality of filter seats. The plurality of filter seats 204 can be patterned such that the plurality of filters are stable upon disposing the plurality of filters 107 on the substrate. In some implementations, the one or more of the plurality of filters 107 can be thinner in an area integrated with the waveguide 102. The plurality of filters 107 can be selectively thinned in areas that will be integrated with the waveguide 102.

The plurality of filters 107 can each be configured for filtering different components (e.g., wavelengths, frequencies). The plurality of filters 107 can be fabricated using physical vapor deposition, electron beam evaporation, or sputtering, and/or the like. The plurality of filters 107 can be fabricated on a single substrate (e.g., a thin substrate), or multiple substrates. Each of the plurality of filters can be fabricated separately. Each of the plurality of filters 107 can be cut (e.g., diced, from the substrate) to match a specified size.

FIG. 3C shows fabrication of a waveguide core for the example device. The waveguide 102 can be formed using a waveguide mask (e.g., or waveguide mold). The waveguide mask can made on a (e.g., chromium) photomask. The waveguide mask can be treated (e.g., in fluoroctatrichlorosilane (FOTS)) to avoid stiction of a polymer material of the waveguide 102 in subsequent steps. The waveguide mask can be coupled to the substrate. The waveguide mask can be aligned (e.g., and held together with a holder) with the substrate (e.g., and/or the plurality of filter seats 204).

The waveguide mask and substrate (e.g., coupled together in a fixed/aligned position) can be heated (e.g., by a hotplate) with the polymer material (e.g., SU-8 2025). The temperature (e.g., of the hotplate) can be gradually increased. As an example, temperature can be gradually increased from 45° C. to 95° C. in about 30 minutes. The polymer can be caused to flow (e.g., due to the increase in temperature) into the waveguide mask (e.g., or mold). The polymer can flow into the waveguide mask based on the capillary effect. Because of the increase of the temperature, viscosity of the polymer gradually decreases and the polymer can flow between the waveguide mask (e.g., or mold) and substrate due to capillary effect.

The temperature can be decreased gradually. As an example, every 10-15 minutes the temperature of the hot plate can be decreased by 10-15° C. to room temperature. The substrate and/or waveguide mask (e.g., or mold) can be exposed from the side of the waveguide mask. The waveguide mask can be released. The polymer material (e.g., waveguide and lens) can be developed in a developer (e.g., SU-8 developer). The resulting polymer can comprise a core and/or a lens of the waveguide. After developing the core 208 of the waveguide, a polymer or other material can be used for the cladding 210. As shown in FIG. 2, the cladding 210 can be disposed adjacent (e.g., over, on top of, at least partially enclosing) the core. The cladding 210 can be added using the same or a similar process that was used to fabricate the core 208.

The disclosed fabrication processes can include a variety of further features. The plurality of filters 107 can be any commercially available filter (e.g., eliminating the need for fabrication of the plurality of filters 107). The plurality of filters 107 can be deposited on a tip of the waveguide 102. The fabrication process can be done using a spinning process instead of a molding process. The plurality of filters 107 can be made with angular variation to achieve a higher spectroscopic resolution. The substrate 202 used for fabrication of the plurality of filters 107 can be polished and/or oriented in different angles to use the same deposition run for making multiple filters.

Figure 4:
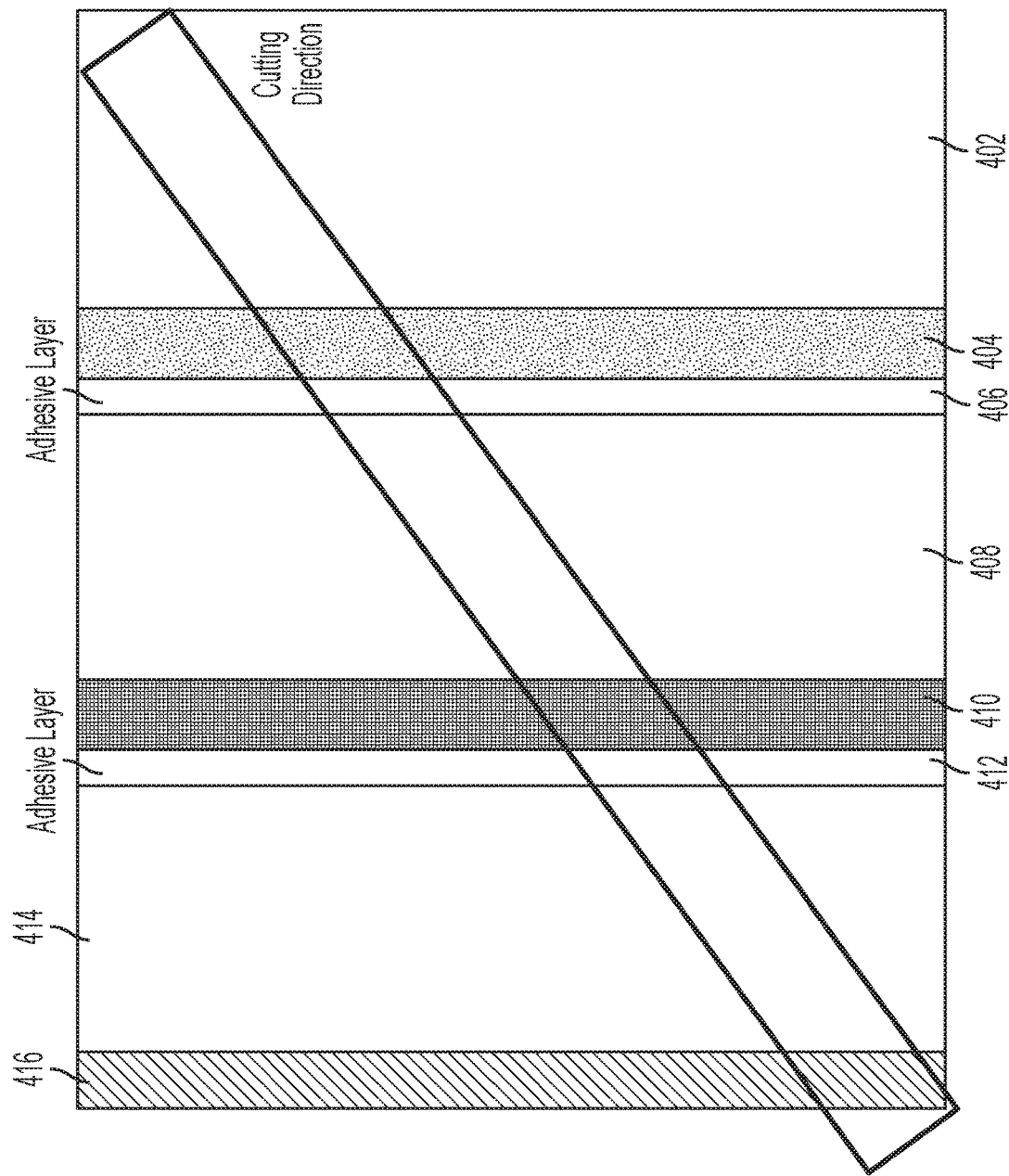
FIG. 4 shows cutting a stack of filters on corresponding substrates to form a waveguide.

Another example variation to the fabrication process is shown in FIG. 4. As shown in FIG. 4, the plurality of filters 107 can be fabricated using multiple substrates (e.g., thick substrates). Each filter can be attached to a corresponding substrate. An adhesive layer can be used to attach a filter to a corresponding substrate. A first filter 402 can be formed on a first substrate 404. A first adhesive layer 406 can be disposed on the first filter 402.

A second substrate 408 can be attached to the first adhesive layer 406. A second filter 410 can be formed on the second substrate 408. A second adhesive layer 412 can be disposed on the second filter 410. A third substrate 414 can be attached to the second adhesive layer 412. A third filter 416 can be formed on the third substrate 414. The stack of substrates and filters can be cut (e.g., diced) in a specific direction (e.g., angled with respect to a direction perpendicular to the surface of the layers). The cut portion of the stack can be configured as a waveguide with filters. The substrates (e.g., cut portion of the substrates between the filters) can be used as a waveguide (e.g., while the filters function as filters and/or mirrors).

Figure 5:
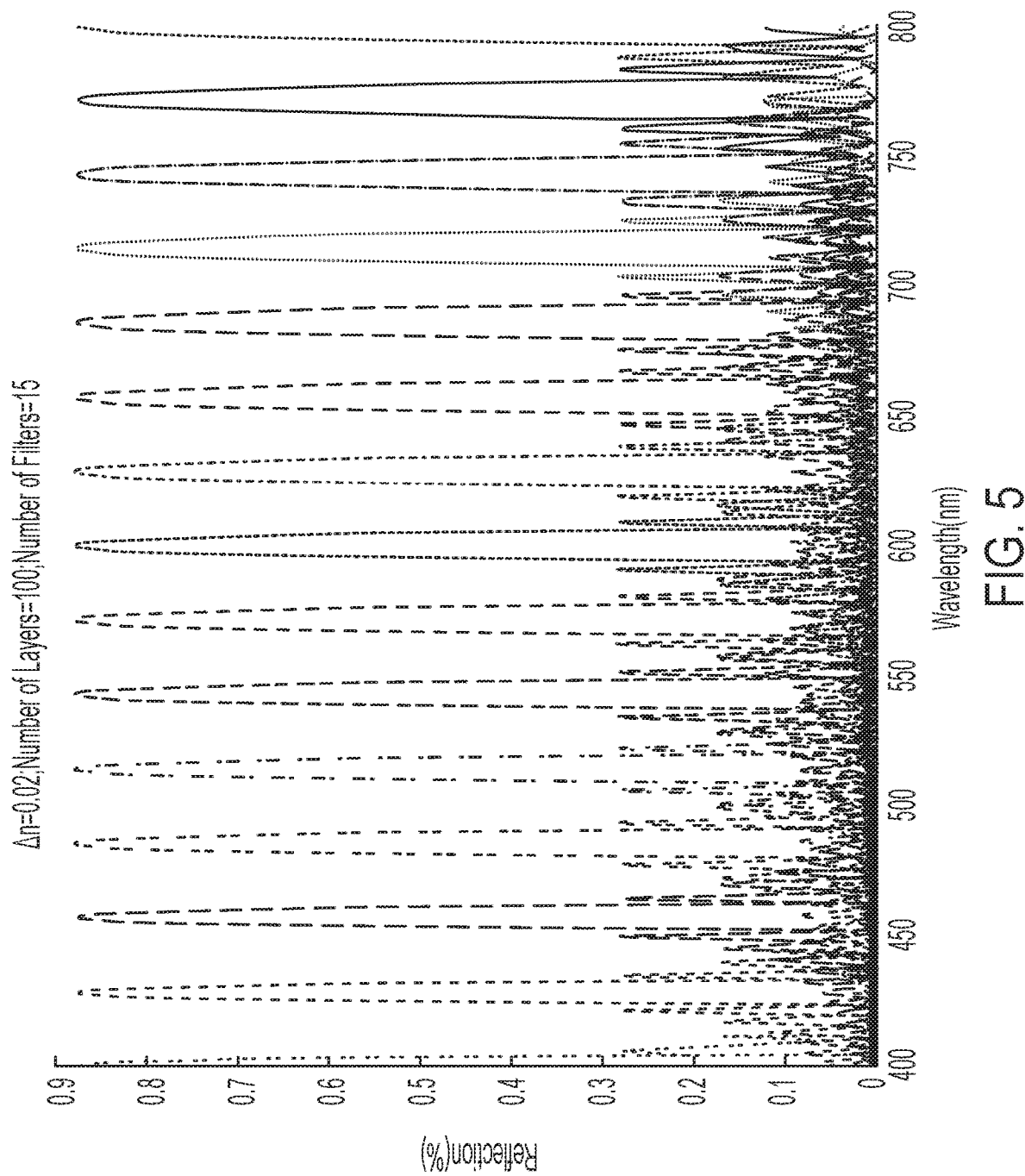
FIG. 5 shows a Bragg reflector calculation.

FIG. 5 shows a Bragg reflector calculation for an example device. The calculation is based on 15 filters in the line for the wavelength range of 400-800 nm. The bandgap structure can be described as follows:

$$\Delta\omega_{gap} = \omega_0 * \frac{4}{\pi} \mathrm{asin} \left| \frac{n_2 - n_1}{n_2 + n_1} \right|$$

$$\text{thickness layer } 1 = \frac{\lambda}{4n_1}; \text{thickness layer } 2 = \frac{\lambda}{4n_2}$$

$$\text{Reflectivity for } N \text{ bilayers} = \left( \frac{n_2^{2N} - n_1^{2N}}{n_2^{2N} - n_1^{2N}} \right)^2$$

The central wavelength can be, e.g., 600 nm, which value is exemplary and not limiting. In one exemplary bilayer structure: $n_1$=1.46; $n_2$=1.48; $t_1$=103 nm; $t_2$=101 nm.

Figure 6:
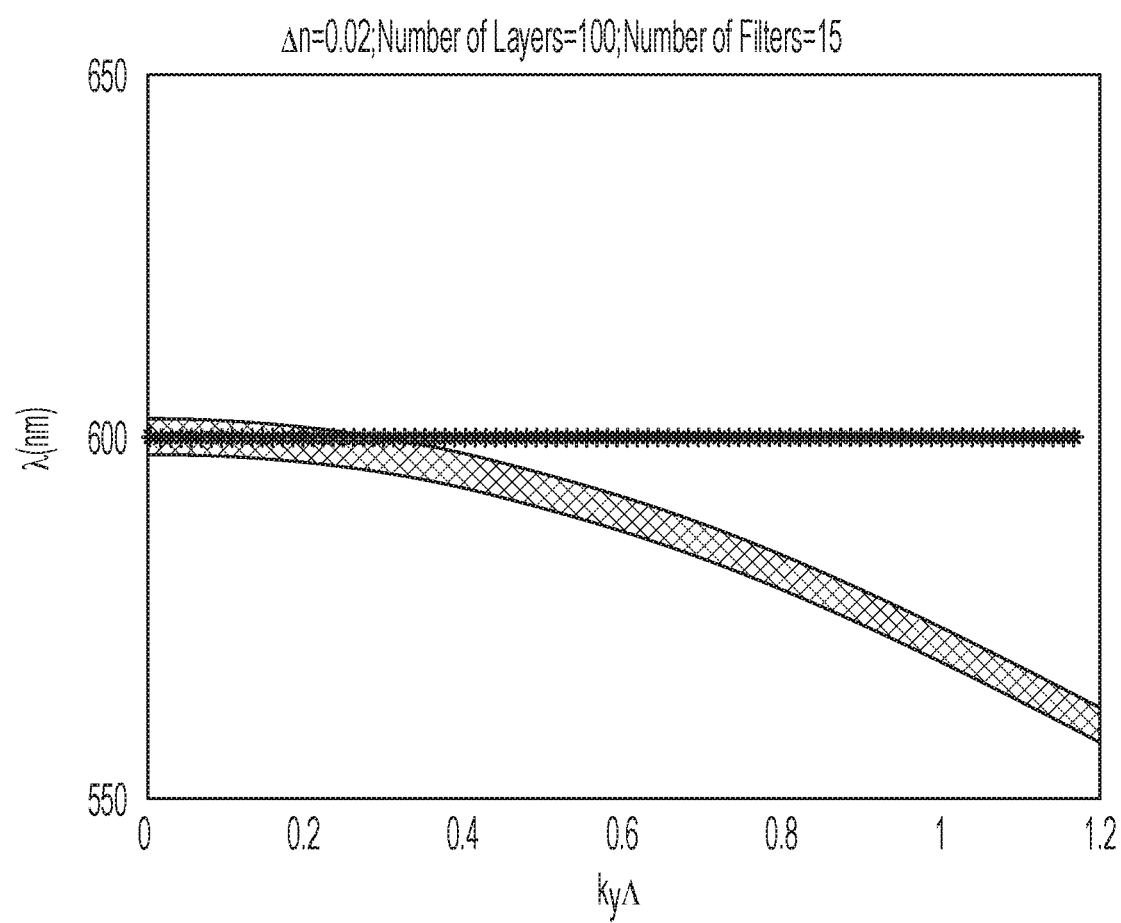
FIG. 6 shows an example band structure around the wavelength in the wavelength domain.

FIG. 6 shows an example band structure in the wavelength domain. The patterned region (e.g., line hatching) is the reflection area and the blank area (e.g., white area) is the transmission area. The $k_y$ is they component of the wavevector (wave propagation in the z direction). The horizontal line (e.g., using *) are the $k_y$ value of all of the existing modes (92 TE modes). The first 23 modes of the waveguide are located in a target reflection region. This analysis is for the 600 nm (the filter for the middle wavelength) wavelength.

Figure 7:
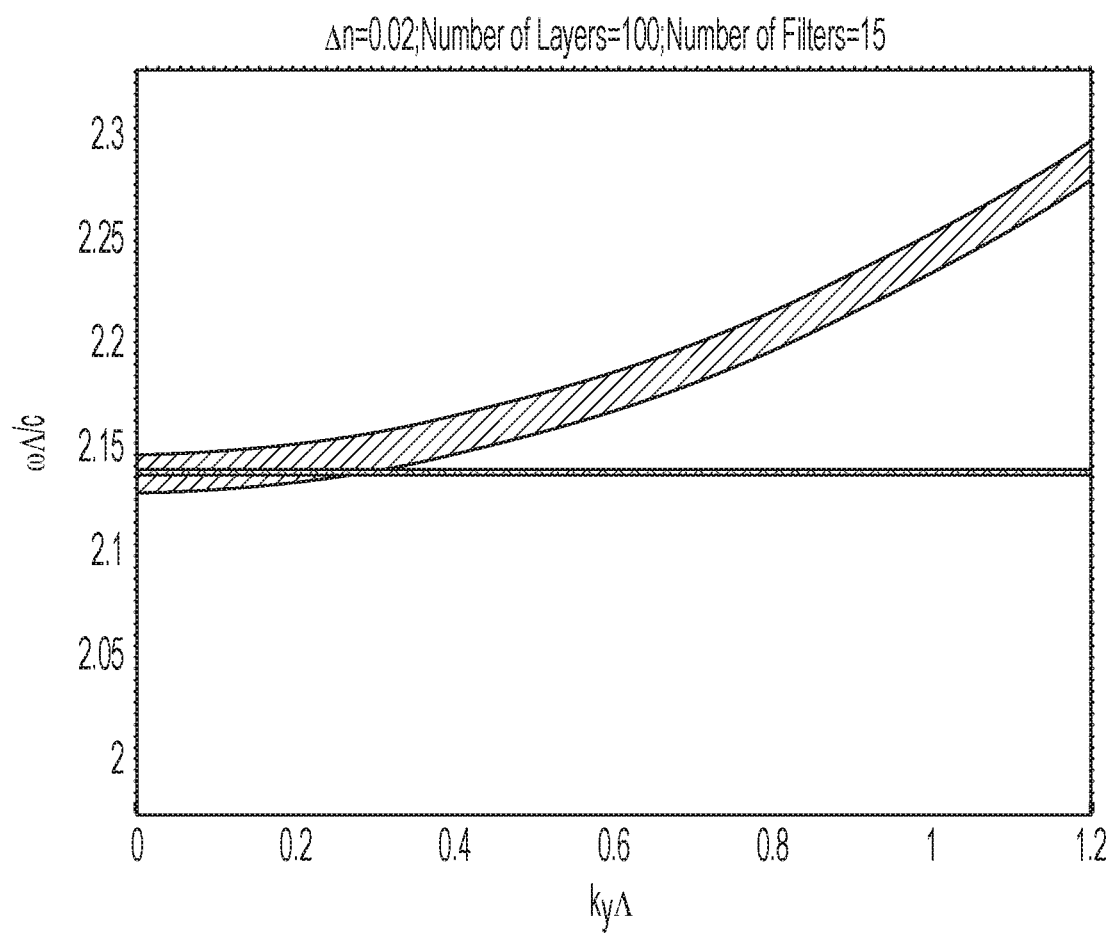
FIG. 7 shows an example band structure.
Figure 8:
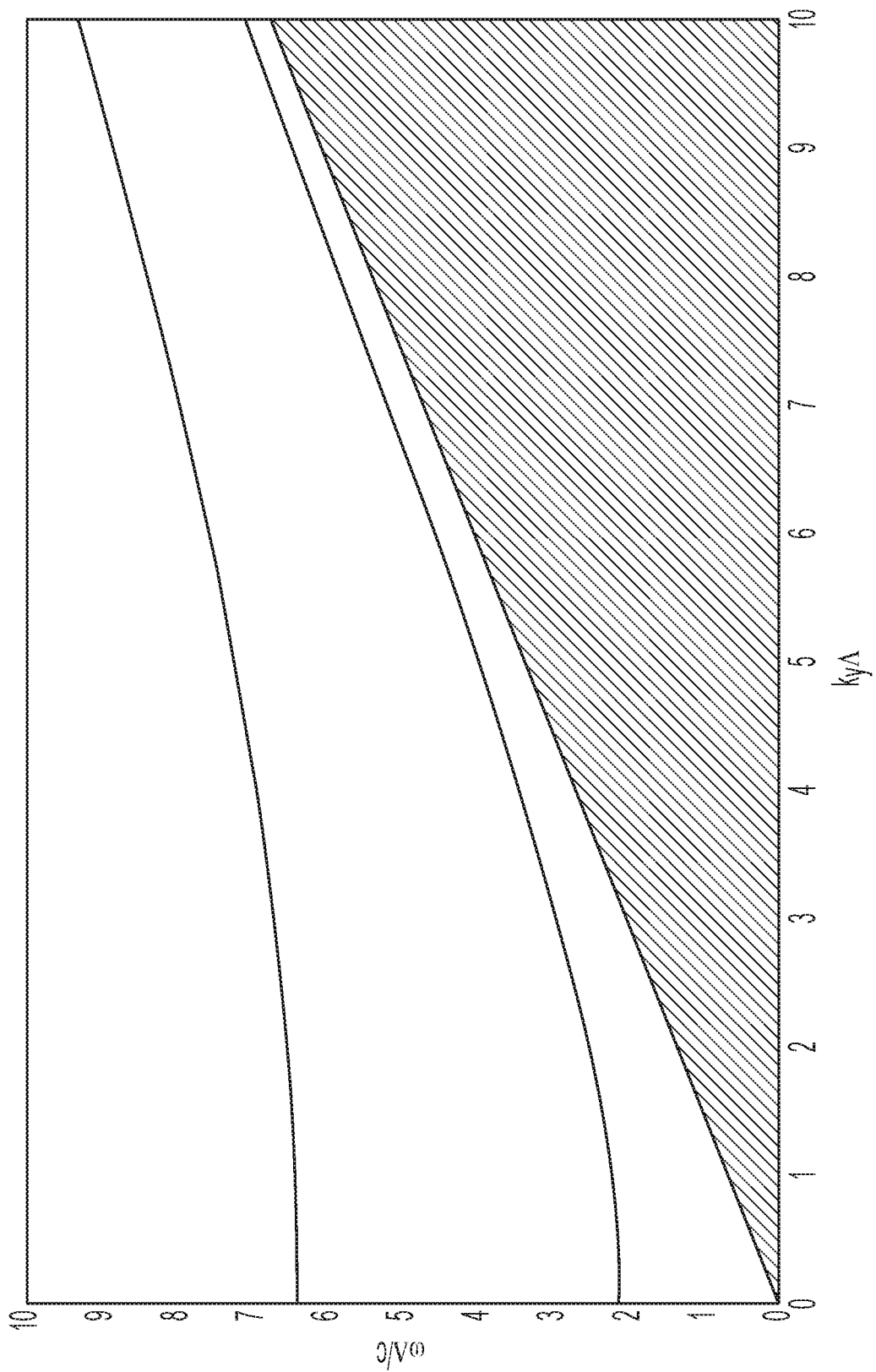
FIG. 8 shows a whole bandgap structure from 0 to very high frequency.

$\Lambda = t_1 + t_2$ the period of the Bragg. FIG. 7 shows a band structure around the target wavelength in angular frequency domain (horizontal line for the frequency). FIG. 8 shows a whole bandgap structure from 0 to very high frequency. The curved lines and pattern represent the reflection area, and the white/blank area is the transmission area.

Eigen Mode Analysis

A waveguide can be considered as a slab of 100 μm with core refractive index of 1.56 and cladding refractive index of 1.46.

Mode participation calculation $E_i$ (mode number i) and $c_i$ (mode participation coefficient).

The excitation field (excitation vector) can be written as a linear combination of the waveguide Eigen modes (Eigen vectors):

$$[\text{Excitation Field}] = \sum_{i(mode\#)=1}^{n} c_i E_i$$

To find the $c_i$ (mode participation coefficient) for each Eigen mode, the dot product of the excitation field (excitation vector) can be performed with each Eigen mode (Eigen vector):

$$c_i = [\text{Excitation Field}] \cdot E_i$$

Figure 9A:
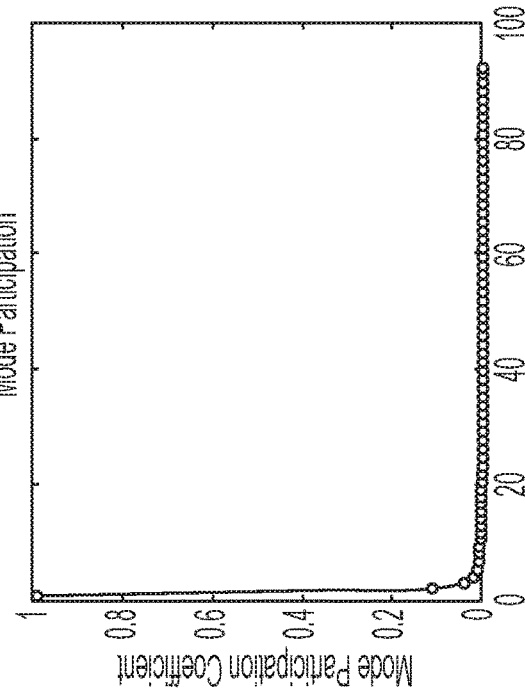
FIG. 9A shows amplitude coefficient values for different mode numbers.
Figure 9B:
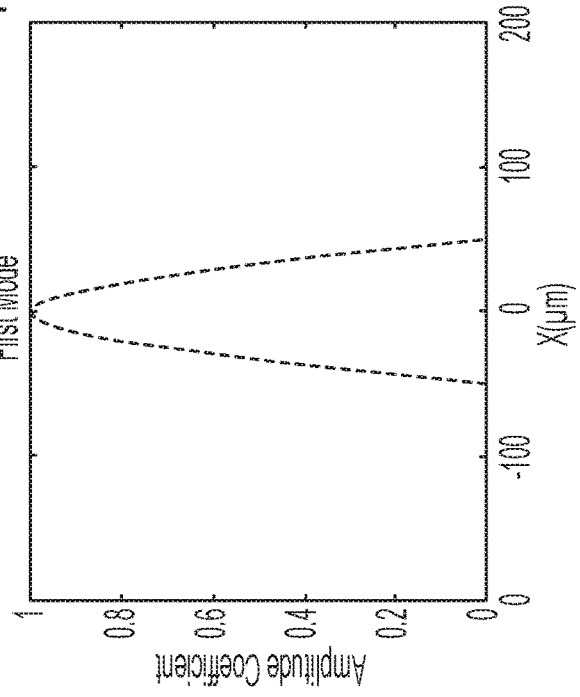
FIG. 9B shows mode participation coefficient values for different mode numbers.
Figure 9C:
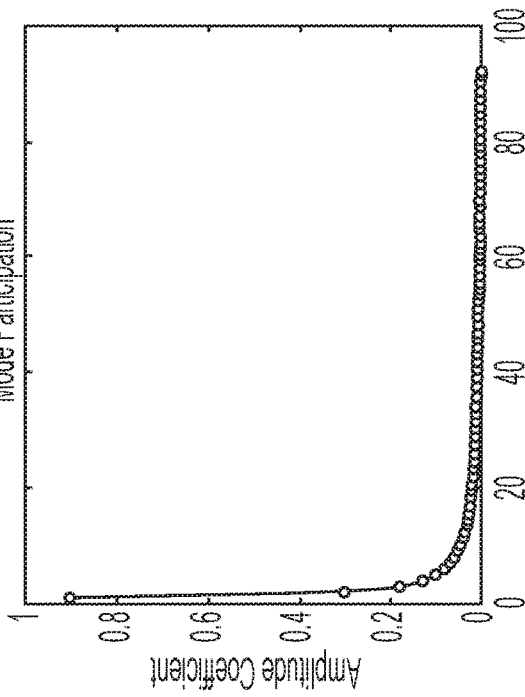
FIG. 9C shows X(µm) for the excitation field.
Figure 9D:
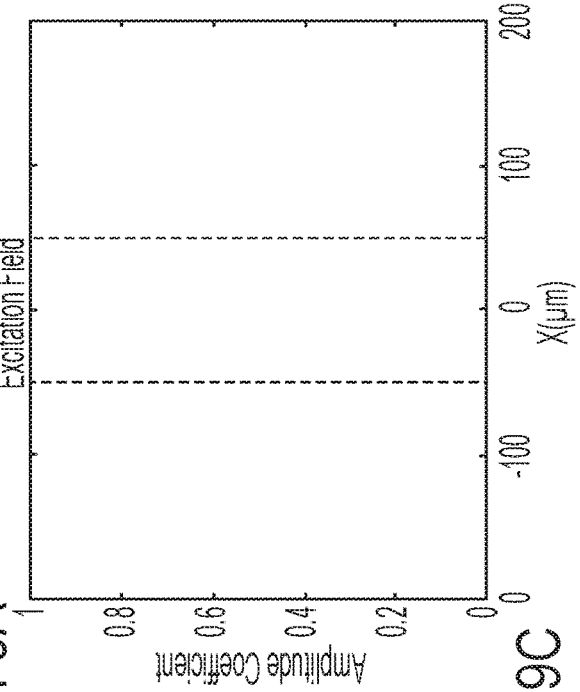
FIG. 9D shows X(µm) for the first mode.

FIGS. 9A-9D shows mode participation. FIG. 9A shows amplitude coefficient values for different mode numbers. FIG. 9B shows mode participation coefficient values for different mode numbers. FIG. 9C shows X(μm) for the excitation field. FIG. 9D shows X(μm) for the first mode. These graphs show that most of the energy is stored in first 4-5 modes and there is almost no energy in the modes after 23. Therefore, a device according to the present disclosure can preserve and reflect almost all of the energy in the excitation field. Table 1 provides an analysis for TE mode, as follows.

TABLE 1

| Mode Participation Coefficients for all modes (mode number italicized) | |
|---|---|
| *1* | 0.902294 |
| *2* | −0.30073 |
| *3* | 0.180398 |
| *4* | −0.12881 |
| *5* | 0.100137 |
| *6* | −0.08188 |
| *7* | 0.069236 |
| *8* | −0.05995 |
| *9* | 0.05285 |
| *10* | −0.04724 |
| *11* | 0.042685 |
| *12* | −0.03892 |
| *13* | 0.035756 |
| *14* | −0.03306 |
| *15* | 0.030724 |
| *16* | −0.02869 |
| *17* | 0.026898 |
| *18* | −0.02531 |
| *19* | 0.023887 |
| *20* | −0.02261 |
| *21* | 0.021452 |
| *22* | −0.0204 |
| *23* | 0.019439 |
| *24* | −0.01856 |
| *25* | 0.017747 |
| *26* | −0.017 |
| *27* | 0.0163 |
| *28* | −0.01565 |
| *29* | 0.015048 |
| *30* | −0.01448 |
| *31* | 0.013952 |
| *32* | −0.01345 |
| *33* | 0.012983 |
| *34* | −0.01254 |
| *35* | 0.012118 |
| *36* | −0.01172 |
| *37* | 0.011341 |
| *38* | −0.01098 |
| *39* | 0.010638 |
| *40* | −0.01031 |
| *41* | 0.009998 |
| *42* | −0.0097 |
| *43* | 0.00941 |
| *44* | −0.00913 |
| *45* | 0.008868 |
| *46* | −0.00861 |
| *47* | 0.008367 |
| *48* | −0.00813 |
| *49* | 0.007898 |
| *50* | −0.00768 |
| *51* | 0.007462 |
| *52* | −0.00725 |
| *53* | 0.00705 |
| *54* | −0.00685 |
| *55* | 0.006663 |
| *56* | −0.00648 |
| *57* | 0.006295 |
| *58* | −0.00612 |
| *59* | 0.005945 |
| *60* | −0.00578 |
| *61* | 0.005611 |
| *62* | −0.00545 |
| *63* | 0.005289 |
| *64* | −0.00513 |
| *65* | 0.004981 |
| *66* | −0.00483 |
| *67* | 0.004681 |
| *68* | −0.00453 |
| *69* | 0.004389 |
| *70* | −0.00425 |
| *71* | 0.004103 |
| *72* | −0.00396 |
| *73* | 0.003823 |
| *74* | −0.00368 |
| *75* | 0.003546 |
| *76* | −0.00341 |
| *77* | 0.003268 |
| *78* | −0.00313 |
| *79* | 0.00299 |
| *80* | −0.00285 |
| *81* | 0.002706 |
| *82* | −0.00256 |
| *83* | 0.002413 |
| *84* | −0.00226 |
| *85* | 0.002105 |
| *86* | −0.00194 |
| *87* | 0.001772 |
| *88* | −0.00159 |
| *89* | 0.00139 |
| *90* | −0.00117 |
| *91* | 0.000902 |
| *92* | −0.00054 |

Applications of the disclosed technology include, without limitation, remote optical sensors, an optical fiber sensor that probes the environment around the fiber (e.g., used to read out signals for analysis without being physically connected), laser or non-coherent light analysis (e.g., the beam can be analyzed without having to reconfigure light beams or lasers, as the device can read free space light), wireless connection between optical fibers, GPS signaling, a combination thereof, and/or the like.

Alignment tolerance for components on devices: The alignment tolerance can be based on the bandwidth of each filter.

Density (packing/closeness) of filters: The disclosed filters can be any distance apart. The distance between each filter can be at least W×sin(θ) which W is the width of the waveguide and θ is angle which the filter is located.

Applications: The disclosed devices can be used in various applications (e.g., optogenetics, microscopy, etc.). The filter characteristics (e.g., linewidths and center wavelength) and size of the device can be adjusted to meet the specifications of a particular application.

Features of the connectors used to connect optical fibers to devices: Because the disclosed waveguides can be comparatively large, connecting the device can be very simple; one can use edge coupling for the coupling of the fiber to the waveguide.

If a higher wavelength resolution is desired, grating, tunable Mach-Zehnder/Micheleson interferometers, or tunable Fabry Perot resonator/optical cavity can be added. The tenability in the Fabry-Perot, or Mach-Zehnder/Micheleson interferometers can be generated using the thermo-optical effect in the refractive index of the polymeric waveguide.

The present disclosure relates to at least the following illustrative, non-limiting aspects.

Aspect 1. A method, comprising: coupling a plurality of optical filters to a substrate; and coupling a polymeric waveguide to the plurality of optical filters, wherein the polymeric waveguide is configured to guide a free space optical signal along the polymeric waveguide and communicate, via the plurality of optical filters, one or more components of the free optical space signal to an integrated chip.

Aspect 2. The method of Aspect 1, wherein coupling the plurality of optical filters to the substrate comprises disposing an adhesive to couple the plurality of optical filters to the substrate.

Aspect 3. The method of any of Aspects 1-2, further comprising forming a plurality of filter seats on the substrate.

Aspect 4. The method of Aspect 3, wherein coupling the plurality of optical filters to the substrate comprises coupling one or more of the plurality of optical filters to a corresponding filter seat of the plurality of filter seats.

Aspect 5. The method of any of Aspects 3-4, wherein coupling the plurality of optical filters to corresponding filter seats of the plurality of filter seats comprises physically coupling the plurality of optical filters to corresponding filter seats of the plurality of filter seats using an adhesive.

Aspect 6. The method of any of Aspects 1-5, further comprising forming the plurality of optical filters.

Aspect 7. The method of Aspects 6, wherein forming the plurality of optical filters comprises forming each of the plurality of optical filters separately.

Aspect 8. The method of any of Aspects 6-7, wherein forming the plurality of optical filters comprises forming plurality of optical filters using one or more of electronic beam evaporation or sputtering.

Aspect 9. The method of any of Aspects 6-8, wherein forming the plurality of optical filters comprises forming a plurality of substrate layers and depositing the plurality of optical filters on the plurality of substrate layers, and wherein the plurality of substrate layers are configured as additional waveguides for corresponding filters of the plurality of optical filters.

Aspect 10. The method of any of Aspects 1-9, further comprising forming the polymeric waveguide.

Aspect 11. The method of any of Aspects 1-10, wherein coupling the polymeric waveguide to the plurality of optical filters comprises forming the polymeric waveguide.

Aspect 12. The method of any of Aspects 10-11, wherein forming the polymeric waveguide comprises: forming a core comprising a first polymeric material having a first refractive index; and forming a cladding at least partially surrounding the core and comprising a second polymeric material having a second refractive index lower than the first refractive index.

Aspect 13. The method of Aspect 12, wherein forming the core comprises causing the first polymeric material to flow between a mold and the substrate based on a capillary effect.

Aspect 14. The method of any of Aspects 12-13, wherein forming the core comprises forming a photomask and treating the photomask with a material configured to reduce stiction between the photomask and the first polymeric material.

Aspect 15. The method of any of Aspects 12-14, wherein forming the core comprises decreasing a temperature applied to one or more of a mold or a substrate. This can be performed at intervals, e.g., to reduce the formation of defects in the polymeric waveguide.

Aspect 16. The method of any of Aspects 1-15, wherein the plurality of optical filters and the polymeric waveguide are edge coupled.

Aspect 17. The method of any of Aspects 1-16, wherein the plurality of optical filters comprise a first optical filter arranged at a first angle with respect to the polymeric waveguide and a second optical filter arranged at a second angle with respect to the polymeric waveguide, wherein the second angle is different than the first angle.

Aspect 18. The method of any of Aspects 1-17, wherein the one or more components comprise one or more wavelengths of the free space optical signal.

Aspect 19. The method of any of Aspects 1-18, wherein one or more of the plurality of optical filters are disposed on a tip of the polymeric waveguide.

Aspect 20. The method of any of Aspects 1-19, wherein forming the polymeric waveguide is based on a spin coating process.

Aspect 21. The method of any of Aspects 1-20, wherein the integrated chip is configured to perform one or more of optical sensing, wireless communication between optical fibers, laser light analysis, or non-coherent light analysis.

Aspect 22. The method of any of Aspects 1-21, wherein the polymeric waveguide comprises a multimode waveguide.

Aspect 23. The method of any of Aspects 1-22, wherein the polymeric waveguide comprises an optically transparent polymer, wherein the polymer comprises one or more of an epoxy based polymer, a hybrid polymer, an acrylic, or polyurethane.

Aspect 24. The method of Aspect 23, wherein the polymer comprises SU-8 2025.

Aspect 25. The method of any of Aspects 1-24, wherein the plurality of optical filters are configured to de-multiplex the free space optical signal into the one or more components.

Aspect 26. The method of any of Aspects 1-25, wherein the plurality of optical filters are configured to receive a plurality of light signals from the integrated chip and multiplex the plurality of light signals into a multimode light signal along the polymeric waveguide.

Aspect 27. The method of any of Aspects 1-26, wherein the plurality of optical filters are optically coupled to a plurality of optical fibers configured to guide the one or more components to the integrated chip.

Aspect 28. The method of Aspect 27, wherein the plurality of optical fibers are configured to guide the one or more components to different portions of the integrated chip.

Aspect 29. The method of any of Aspects 1-28, wherein a size of the polymeric waveguide enables analysis of ill-defined input/output light beams.

Aspect 30. The method of Aspect 29, wherein the ill-defined input/output light beams comprise light beams having a width in a range of about 10 µm to about 100 µm.

Aspect 31. The method of Aspect 29, wherein the ill-defined input/output light beams comprise light beams having a width of at least about 10 µm.

Aspect 32. The method of any of Aspects 1-31, wherein the integrated chip is located on the substrate.

Aspect 33. A device, comprising: a polymeric waveguide configured to guide a free space optical signal along the polymeric waveguide; and a plurality of optical filters coupled with the polymeric waveguide and configured to guide one or more components of the free space optical signal to an integrated chip configured to process the one or more components of the free space optical signal.

Aspect 34. The device of Aspect 33, further comprising one or more features of Aspects 1-32.

Definitions

It is to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise. The term "about" as used herein can allow for a degree of variability in a value or range, for example, within 10%, within 5%, or within 1% of a stated value or of a stated limit of a range, and includes the exact stated value or range. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

What is claimed:

1. A method, comprising:
    coupling a plurality of optical filters to a substrate; and
    coupling a polymeric waveguide to the plurality of optical filters, wherein the polymeric waveguide is configured to receive, from free space, an optical signal, guide the optical signal along the polymeric waveguide, and communicate, via the plurality of optical filters, one or more components of the optical signal to an integrated chip.

2. The method of claim 1, further comprising forming a plurality of filter seats on the substrate.

3. The method of claim 2, wherein coupling the plurality of optical filters to corresponding filter seats of the plurality of filter seats comprises physically coupling the plurality of optical filters to corresponding filter seats of the plurality of filter seats using an adhesive.

4. The method of claim 1, wherein coupling the polymeric waveguide to the plurality of optical filters comprises forming the polymeric waveguide.

5. The method of claim 4, wherein forming the polymeric waveguide comprises:
    forming a core comprising a first polymeric material having a first refractive index; and
    forming a cladding at least partially surrounding the core and comprising a second polymeric material having a second refractive index lower than the first refractive index.

6. The method of claim 5, wherein forming the core comprises causing the first polymeric material to flow between a mold and the substrate based on a capillary effect.

7. The method of claim 5, wherein forming the core comprises decreasing a temperature applied to one or more of a mold or the substrate at intervals to minimize defects in the polymeric waveguide.

8. The method of claim 1, wherein the one or more components comprise one or more wavelengths of the optical signal.

9. The method of claim 1, wherein the integrated chip is configured to perform one or more of optical sensing, wireless communication between optical fibers, laser light analysis, or non-coherent light analysis.

10. The method of claim 1, wherein the polymeric waveguide comprises an optically transparent polymer, wherein the polymer comprises one or more of an epoxy based polymer, a hybrid polymer, an acrylic, or polyurethane.

11. The method of claim 1, wherein the plurality of optical filters are configured to de-multiplex the optical signal into the one or more components.

12. The method of claim 1, wherein the plurality of optical filters are configured to receive a plurality of light signals from the integrated chip and multiplex the plurality of light signals into a multimode light signal along the polymeric waveguide.

13. The method of claim 1, wherein the plurality of optical filters are optically coupled to a plurality of optical fibers configured to guide the one or more components to different portions of the integrated chip.

14. A device, comprising:
- a polymeric waveguide configured to receive, from free space, an optical signal and guide the optical signal along the polymeric waveguide; and
- a plurality of optical filters coupled with the polymeric waveguide and configured to guide one or more components of the optical signal to an integrated chip configured to process the one or more components of the optical signal.

15. The device of claim 14, wherein the integrated chip is configured to perform one or more of optical sensing, wireless communication between optical fibers, laser light analysis, or non-coherent light analysis.

16. The device of claim 14, wherein the polymeric waveguide comprises an optically transparent polymer, wherein the polymer comprises one or more of an epoxy based polymer, a hybrid polymer, an acrylic, or polyurethane.

17. The device of claim 14, wherein the plurality of optical filters are configured to de-multiplex the optical signal into the one or more components.

18. The device of claim 14, wherein the plurality of optical filters are configured to receive a plurality of light signals from the integrated chip and multiplex the plurality of light signals into a multimode light signal along the polymeric waveguide.

19. The device of claim 14, wherein the plurality of optical filters are optically coupled to a plurality of optical fibers configured to guide the one or more components to different portions of the integrated chip.

20. The method of claim 1, wherein at least one of the plurality of optical filters is configured to separate a corresponding component of the one or more components from the optical signal to the integrated chip while allowing other components of the one or more components to pass through the at least one optical filter without being separated from the optical signal.

* * * * *